(12) United States Patent
Eckert et al.

(10) Patent No.: US 12,427,090 B2
(45) Date of Patent: Sep. 30, 2025

(54) BAG TRANSFER MECHANISM FOR IV COMPOUNDING

(71) Applicant: Omnicell, Inc., Mountain View, CA (US)

(72) Inventors: Robert Eckert, Cranberry Township, PA (US); Walter Petersen, Seattle, WA (US); Ezekiel Braun, Sewickley, PA (US)

(73) Assignee: Omnicell, Inc., Cranberry Township, PA (US)

( * ) Notice: Subject to any disclaimer, the term of this patent is extended or adjusted under 35 U.S.C. 154(b) by 0 days.

(21) Appl. No.: 18/757,953

(22) Filed: Jun. 28, 2024

(65) Prior Publication Data

US 2024/0350364 A1 Oct. 24, 2024

Related U.S. Application Data

(62) Division of application No. 17/005,637, filed on Aug. 28, 2020, now Pat. No. 12,102,596.

(51) Int. Cl.
| | |
|---|---|
| *A61J 1/20* | (2006.01) |
| *B65B 3/00* | (2006.01) |
| *B65B 43/46* | (2006.01) |
| *B65B 55/02* | (2006.01) |
| *B65G 47/82* | (2006.01) |

(Continued)

(52) U.S. Cl.
CPC .......... *A61J 1/2058* (2015.05); *A61J 1/2089* (2013.01); *B65B 3/003* (2013.01); *B65B 43/465* (2013.01); *B65B 55/027* (2013.01); *B65G 47/82* (2013.01); *A61J 2200/70* (2013.01); *F16M 13/00* (2013.01); *G06F 7/06* (2013.01)

(58) Field of Classification Search
CPC .... A61J 1/2058; A61J 1/2089; A61J 2200/70; A61J 1/10; A61J 1/1462; A61J 1/1475; A61J 3/002; A61J 1/16; B65B 3/003; B65B 43/465; B65B 55/027; B65B 2220/14; B65B 65/02; B65G 47/82; F16M 13/00; G06F 7/06; G07F 17/0092
USPC .................................................. 248/415–418
See application file for complete search history.

(56) References Cited

U.S. PATENT DOCUMENTS

| | | | | |
|---|---|---|---|---|
| 7,611,102 | B2 * | 11/2009 | Murray | B65B 43/465 248/101 |
| 8,151,835 | B2 * | 4/2012 | Khan | B65B 3/003 141/315 |
| 12,102,596 | B2 | 10/2024 | Eckert et al. | |

(Continued)

OTHER PUBLICATIONS

U.S. Appl. No. 17/005,637, Non-Final Office Action, Mailed On Oct. 13, 2023, 7 pages.

(Continued)

*Primary Examiner* — Muhammad Ijaz
(74) *Attorney, Agent, or Firm* — Kilpatrick Townsend & Stockton LLP; Darin J. Gibby; Torrey D. Spink (57) ABSTRACT

A bag transfer mechanism for moving intravenous medication delivery bags includes linear actuator and a pantograph mechanism. A proximal end of the pantograph mechanism is coupled to the linear actuator such a that the pantograph mechanism is configured to extend when the linear actuator travels in a first direction, and to retract when the linear actuator travels in a second direction. The bag transfer mechanism also includes a magnet coupled to a distal end of the pantograph mechanism.

18 Claims, 11 Drawing Sheets

(51) Int. Cl.
*F16M 13/00* (2006.01)
*G06F 7/06* (2006.01)

(56) References Cited

U.S. PATENT DOCUMENTS

| | | | |
|---|---|---|---|
| 2002/0153735 A1 | 10/2002 | Kress | |
| 2008/0051937 A1* | 2/2008 | Khan | B65B 43/52 700/231 |
| 2010/0030371 A1 | 2/2010 | Chudy et al. | |
| 2012/0048419 A1* | 3/2012 | Giribona | B65B 3/003 141/1 |
| 2013/0308879 A1* | 11/2013 | Bianco | A61J 1/10 383/13 |
| 2015/0266689 A1 | 9/2015 | Hashimoto | |
| 2017/0053099 A1 | 2/2017 | Coughlin et al. | |
| 2017/0291307 A1* | 10/2017 | Davi | B65G 47/914 |
| 2022/0062105 A1* | 3/2022 | Eckert | B65B 43/465 |
| 2022/0062109 A1* | 3/2022 | Kaintz | B25J 19/022 |
| 2022/0402735 A1* | 12/2022 | Kritzer | B66F 9/07559 |
| 2023/0285246 A1* | 9/2023 | Kaintz | B25J 19/022 |

OTHER PUBLICATIONS

U.S. Appl. No. 17/005,637, Notice of Allowance, Mailed On May 30, 2024, 9 pages.
U.S. Appl. No. 17/005,637, "Supplemental Notice of Allowability", Sep. 6, 2024, 2 pages.
Application No. BR112023002563-0, Office Action, Mailed On Jul. 22, 2025, 4 pages.
Application No. BR112023002563-0, Office Action, Mailed On Apr. 8, 2025, 8 pages.
Application No. EP21862478.1, Extended European Search Report, Mailed On Nov. 4, 2024, 7 pages.
Application No. PCT/US2021/047155, International Preliminary Report on Patentability, Mailed On Mar. 9, 2023, 9 pages.
Application No. PCT/US2021/047155, International Search Report and Written Opinion, Mailed On Dec. 6, 2021, 10 pages.

* cited by examiner

BAG TRANSFER MECHANISM FOR IV COMPOUNDING

CROSS REFERENCES TO RELATED APPLICATIONS

This application is a divisional of U.S. Non-Provisional patent application Ser. No. 17/005,637, filed Aug. 28, 2020 and titled "Bag Transfer Mechanism For IV Compounding", which is related to U.S. patent application Ser. No. 17/005,786, filed concurrently and titled "Medication Dosing Systems and Methods"; U.S. patent application Ser. No. 17/005,650, filed concurrently and titled "Cartridge Loading System for Syringe Caps"; U.S. patent application Ser. No. 17/006,027, filed concurrently and titled "Systems and Methods for Parallel Preparation Processing"; and U.S. patent application Ser. No. 17/005,803, filed herewith and titled "Cabinet with Integrated Pick-and-Place Mechanism"; the disclosures of which are hereby incorporated by reference herein in their entireties for all purposes.

BACKGROUND OF THE INVENTION

Pharmaceutical compounding is the preparation of patient-specific medications by the processing or combination of ingredients. Many medications, especially medications administered orally in pill form, are now manufactured in a variety of forms and dosages so that little preparation is needed at a pharmacy, other than placing the proper number of pills in a bottle to fill a doctor's prescription for a particular patient. However, medications for intravenous delivery are routinely compounded, for example in hospital pharmacies.

Typically, a physician will prescribe a particular medication or a combination of medications for a specific patient, for intravenous (IV) delivery. The pharmacy receives the prescription and prepares the IV solution with the proper amount of each prescribed medication. The compounded medication is then sent to the hospital floor for administration to the patient. Compounding may be especially helpful when more than one medication is prescribed. The medications may be combined in a single IV bag, so that multiple infusions are avoided.

Much of the work of compounding may be performed by robotic compounding machines. The variety of materials that must be handled by the robotic machines may present challenges. For example, the machine must handle objects having a variety of shapes, such as medication vials and syringes, and the machine must also handle flexible objects such as IV bags. It is very important that the compounding be performed without the introduction of contaminants.

There is a need for improved systems and methods for preparing medications for IV delivery.

BRIEF SUMMARY OF THE INVENTION

According to one aspect, a bag transfer mechanism for moving intravenous medication delivery bags comprises a linear actuator and a pantograph mechanism. The pantograph mechanism has a proximal end and a distal end opposite the proximal end. The proximal end is coupled to the linear actuator such that the pantograph mechanism is configured to extend when the linear actuator travels in a first direction, and to retract when the linear actuator travels in a second direction. The bag transfer mechanism further comprises a magnet coupled to the distal end of the pantograph mechanism. In some embodiments, the linear actuator comprises a motor having a shaft; a leadscrew coupled to the shaft of the motor such that the leadscrew is configured to be rotated by the motor; and a nut coupled to the leadscrew, the nut being constrained from rotating about the longitudinal axis of the leadscrew, such that the nut is configured to travel axially along the leadscrew when the leadscrew rotates; and the proximal end of the pantograph mechanism is coupled to the nut such a that the pantograph mechanism is configured to extend when the nut travels in a first direction along the leadscrew, and to retract when the nut travels in a second direction along the leadscrew. In some embodiments, the linear actuator comprises a pneumatic or hydraulic slide, or a linear electric motor. In some embodiments, the magnet is rotatably coupled to the distal end of the pantograph mechanism. In some embodiments, the bag transfer mechanism further comprises a retraction sensor configured to detect when the pantograph mechanism is in a retracted position. In some embodiments, the retraction sensor detects proximity of the magnet. In some embodiments, the bag transfer mechanism further comprises a structure sensor configured to detect the presence or absence of another structure adjacent the mechanism.

In another aspect, a bag assembly for storage and handling of bags for medication for intravenous delivery comprises a bag configured for holding liquid medication for intravenous delivery. The bag further comprises an infusion port for delivery of medication from the bag, and an injection port for receiving medication into the bag. The bag assembly further comprises a bag clamp having a clamshell structure, and clamped to the bag such that the clamp constrains the relationship of the output port and the injection port. The bag assembly further comprises a magnetic target at one end of the bag clamp. In some embodiments, the magnetic target is embedded within the clamp. In some embodiments, the bag assembly further comprises a first identifying label on the bag and a second identifying label on the clamp, the first and second identifying labels corresponding to each other.

According to another aspect, a system for compounding medications for intravenous delivery comprises a processing station having a receiver for a bag assembly having a bag for holding medication for intravenous delivery, a bag clamp, and a magnetic target. The system further comprises a storage location having a receiver for the bag assembly, and a bag transfer mechanism. The bag transfer mechanism comprises a linear actuator; a pantograph mechanism having a proximal end and a distal end opposite the proximal end, the proximal end coupled to the linear actuator such that the pantograph mechanism is configured to extend when the linear actuator travels in a first direction, and to retract when the linear actuator travels in a second direction; and a magnet coupled to the distal end of the pantograph mechanism. The bag transfer mechanism is associated with the storage location and is configured to transfer the bag assembly to the processing station receiver from the storage location receiver by actuation of the pantograph mechanism of the bag transfer mechanism to push the bag assembly from the storage location to the processing station. In some embodiments, the linear actuator comprises a motor having a shaft; a leadscrew coupled to the shaft of the motor such that the leadscrew is configured to be rotated by the motor; and a nut coupled to the leadscrew, the nut being constrained from rotating about the longitudinal axis of the leadscrew, such that the nut is configured to travel axially along the leadscrew when the leadscrew rotates; wherein the proximal end of the pantograph mechanism is coupled to the nut such a that the pantograph mechanism is configured to extend when the nut travels in a first direction along the leadscrew, and to retract when the nut travels in a second direction along the leadscrew. In some embodiments, the linear actuator comprises a pneumatic or hydraulic slide, or a linear electric motor. In some embodiments, the processing station comprises a bag retainer configured to hold the bag assembly in the processing station receiver during retraction of the pantograph mechanism of the bag transfer mechanism. In some embodiments, the system further comprises an enclosure enclosing the processing station, the storage location, and the bag transfer mechanism; and a source of filtered air, configured to flow the filtered air into the enclosure and over the processing station, the storage location, and the bag transfer mechanism; wherein during storage of a bag in the storage location and during movement of the bag to the processing station, the bag is subject to first air from the source of filtered air. In some embodiments, the system comprises multiple processing stations having respective receivers, and comprises multiple storage locations having respective receivers and respective bag transfer mechanisms, and the system further comprises a carousel on which the bag transfer mechanisms are mounted, the carousel configured to rotate to present the different storage locations to the different processing stations. In some embodiments, the bag transfer mechanism is further configured to transfer the bag assembly from the processing station receiver to the storage location receiver by actuation of the pantograph mechanism of the bag transfer mechanism to pull the bag assembly from the processing station to the storage location.

According to another aspect, a method of transferring a bag assembly having a bag for holding medication for intravenous delivery comprises providing a pantograph mechanism having a proximal end and a distal end and a magnet coupled to the distal end, such that the magnet magnetically interacts with a magnetic target in the bag assembly; and retracting the pantograph mechanism such that the bag assembly is pulled from a first location to a second location by the pantograph mechanism and the magnetic attraction between the magnet of the pantograph mechanism and the magnetic target of the bag assembly. In some embodiments, the method further comprises repositioning the bag assembly, and extending the pantograph mechanism such that the bag assembly is pushed from the second location to a third location by the pantograph mechanism. In some embodiments, the method further comprises engaging a bag latch configured to hold the bag assembly in the third location, and retracting the pantograph mechanism such that the magnet of the pantograph mechanism disengages from the magnetic target of the bag assembly. In some embodiments, repositioning the bag assembly comprises rotating a carousel on which the bag assembly is stored.

DETAILED DESCRIPTION OF THE INVENTION

Figure 1:
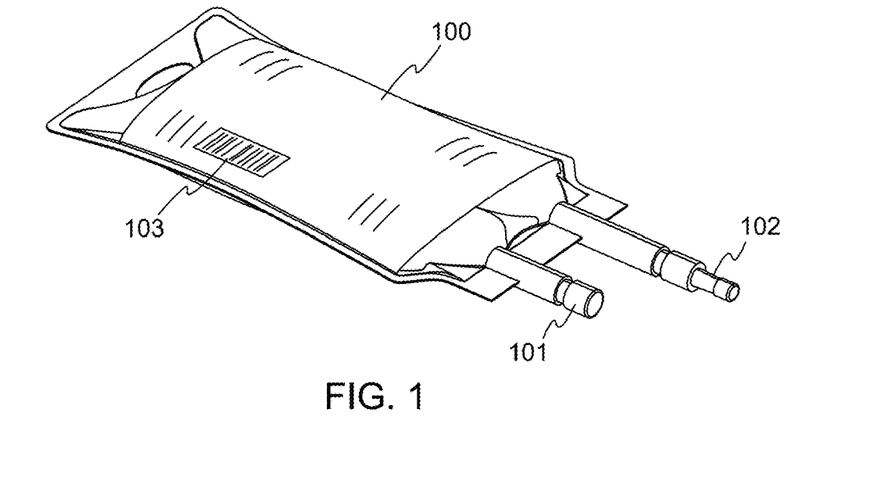
FIG. 1 illustrates a typical bag for holding liquid medication for intravenous (IV) delivery.

FIG. 1 illustrates a typical bag 100 for holding liquid medication for intravenous (IV) delivery. IV bag 100 may be made of a flexible clear plastic, for example polyvinyl chloride (PVC) of another suitable plastic, and may typically have a capacity of 500 to 2000 ml, although bags of smaller and larger capacities are available. In a typical scenario, bag 100 is supplied containing a quantity of a sterile solution, for example saline solution or another solution. Bag 100 has an injection port 101, into which medications may be injected in the medication compounding process. Injection port 101 may be sealed with a soft, rubber-like material that can be pierced by an injection needle, and which seals upon withdrawal of the injection needle.

Bag 100 may also include an infusion port 102, to which a drip line can be connected for delivery of the contents of bag 100 to a patient. Injection port 101, infusion port 102, or both may have a tamper-evident seal (not shown) to ensure that they remain sterile and that any possible contamination can be detected. In some bags, injection port 101 and infusion port 102 may be combined into a single port.

Bag 100 may also include an identifying label 103, for example including a bar code.

Figure 2:
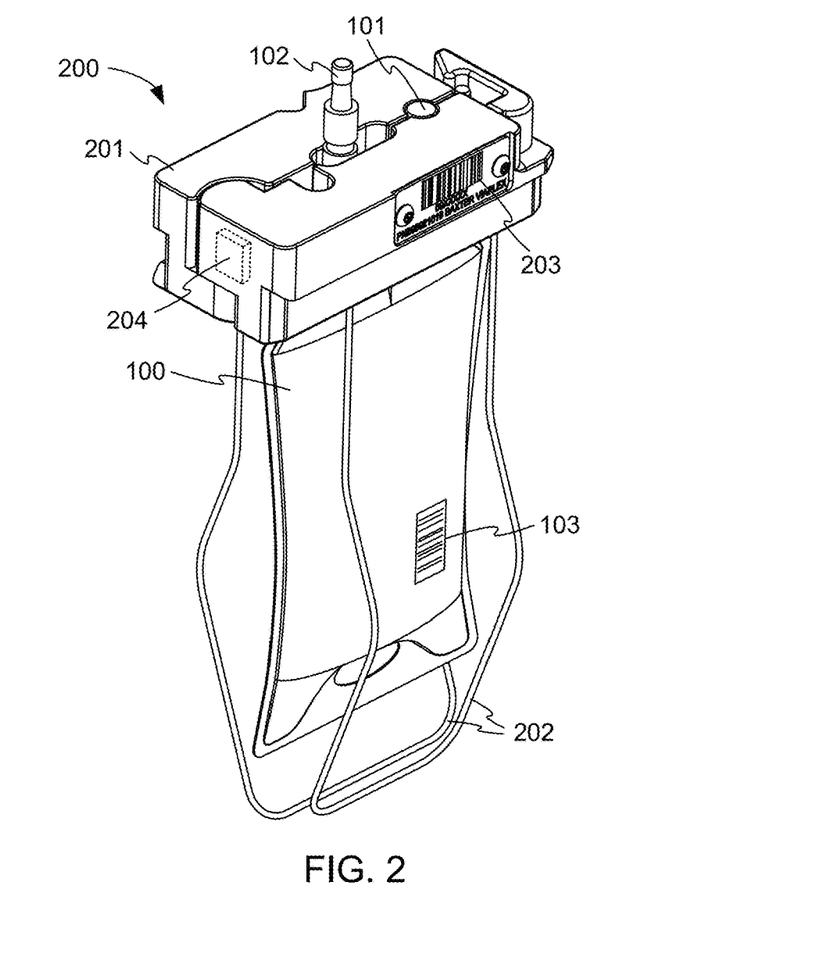
FIG. 2 illustrates a bag assembly in accordance with embodiments of the invention.

Embodiments of the invention may be facilitated by attaching a holder to bag 100, such as bag clamp 201 shown in FIG. 2, to form a bag assembly 200 in accordance with embodiments of the invention. Bag clamp 201 constrains injection port 101 and infusion port 102 to be in fixed positions relative to each other. A wire frame 202 may be provided, for protecting bag 100 during subsequent handling. Bag clamp 201 may also have an identifying label 203, for example including a bar code. Bar code 203 is placed in a fixed position relative to bag clamp 201. Preferably, the two identifying labels are correlated in a database, so that a particular bag 100 can be tracked by tracking its associated bag clamp 201. This arrangement facilitates bag tracking despite the fact that different bags may have their labels in different positions.

Bag clamp 201 also includes a magnetic target 204. Magnetic target 204 may be, for example, a piece of ferromagnetic material, and may be embedded or inserted within a part of bag clamp 201 as shown. The purpose of magnetic target 204 will be explained further below.

Figure 3:
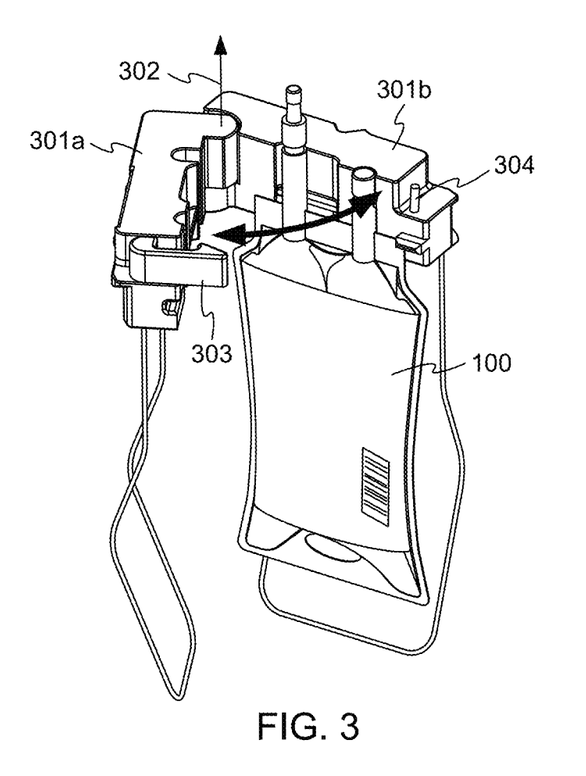
FIG. 3 illustrates the operation of a bag clamp, in accordance with embodiments of the invention.

Bag clamp 201 may operate in clamshell fashion, as shown in FIG. 3. Two portions 301a and 301b of bag clamp 201 can rotate relative to each other about an axis 302. A latch 303 may engage a pin 304 to clamp the two portions 201a and 201b together to hold bag 100 securely in bag clamp 201. Any other suitable kind of clamping and latching mechanism may be used as well.

Figure 4:
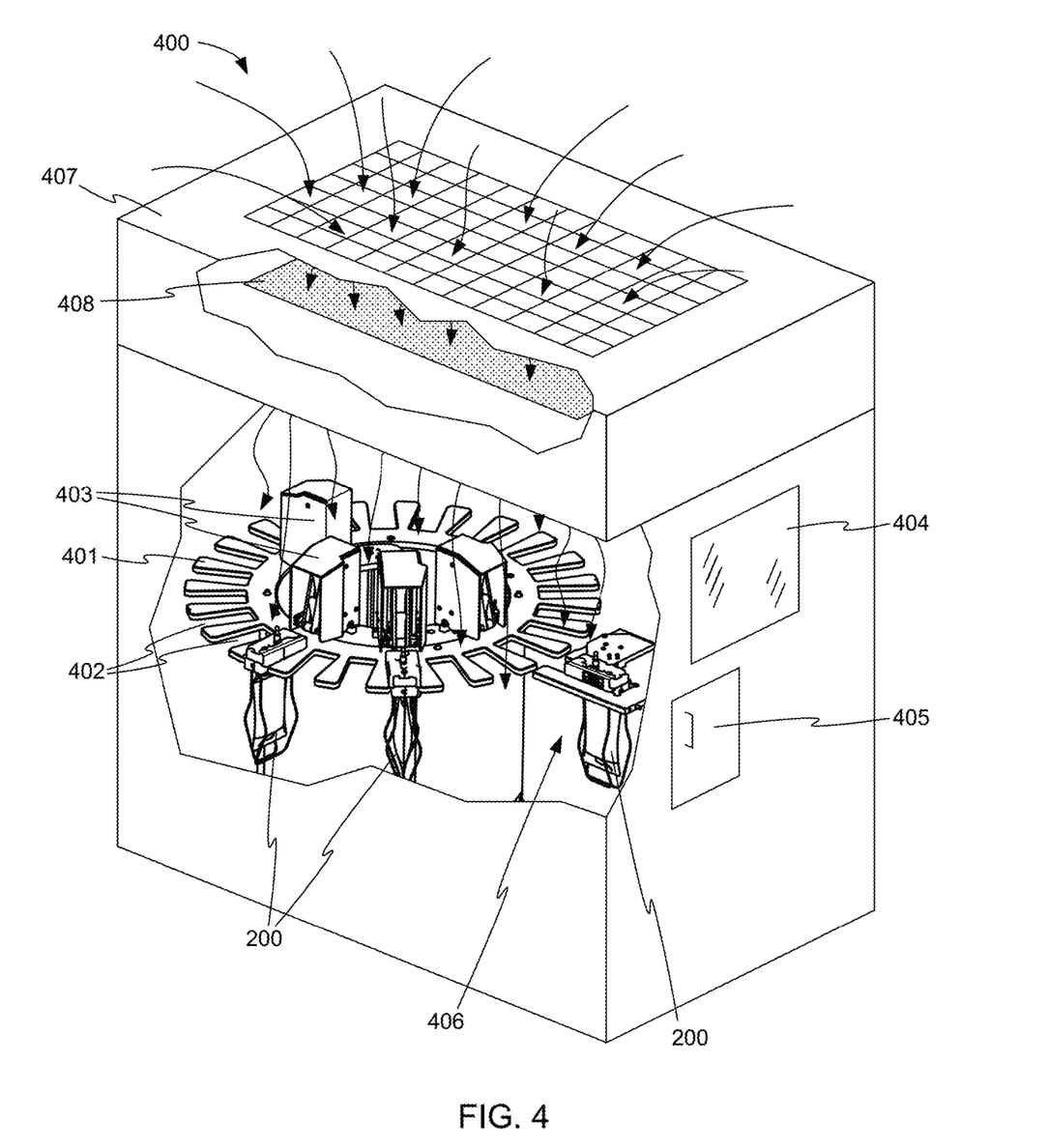
FIG. 4 shows a simplified schematic view of an example robotic compounding device, in accordance with embodiments of the invention

FIG. 4 shows a simplified schematic view of an example robotic compounding device 400, in accordance with embodiments of the invention. Robotic compounding device 400 includes a carousel 401 having number of receivers 402 for receiving IV bag assemblies 200. In this example, receivers 402 are slots in carousel 401 of a shape and size to receive and support the bag clamps of bag assemblies 200. Some of the receivers have corresponding bag transfer mechanisms 403, which are described in more detail below. Carousel 401 can rotate about a vertical axis, under the control of a computerized controller (not shown).

Compounding device 400 is preferably fully enclosed so as to maintain as sterile an environment as possible inside of device 400. Any number of windows 404 and access doors 405 may be provided, for observation of the operation of compounding device 400, for loading and unloading IV bag assemblies, and the like.)

Compounding device 400 also includes one or more processing stations disposed around carousel 401, for example processing station 406. Bag assemblies 200 can be moved by bag transfer mechanisms 403 to the processing station(s) for various kinds of processing, for example injection of mediation, capping, weighing, or other processes.

Other items and mechanisms may be present in compounding device 400, but are omitted for clarity of illustration and because they are not directly related to the claimed invention. For example a robot arm may be conveniently mounted on the center of carousel 401, and used to move syringes, vials, and other items around the interior of compounding device 401.

Compounding device 400 also includes an air handler 407, having a high efficiency filter 408, for example a High Efficiency Particulate Air (HEPA) filter, for supplying clean air to the interior of compounding device 400.

In the terminology of the industry, the injection ports 101 of bag assemblies 200 are "critical sites" for which cleanliness is especially important. For this reason, it is highly desirable that the injection ports be subjected to "first air" as much of the time as possible. The term "first air" refers to air that flows unidirectionally from filter 408 and does not encounter any other item before washing over bag assemblies 200. As such, first air has not had any chance to take up particles or other contaminants from other items inside compounding device 400 before washing over bag assemblies 200. According to embodiments of the invention, bag transfer mechanisms 403 maintain bag assemblies 200 in an orientation in which they receive first air during storage and all transitions.

Figure 5:
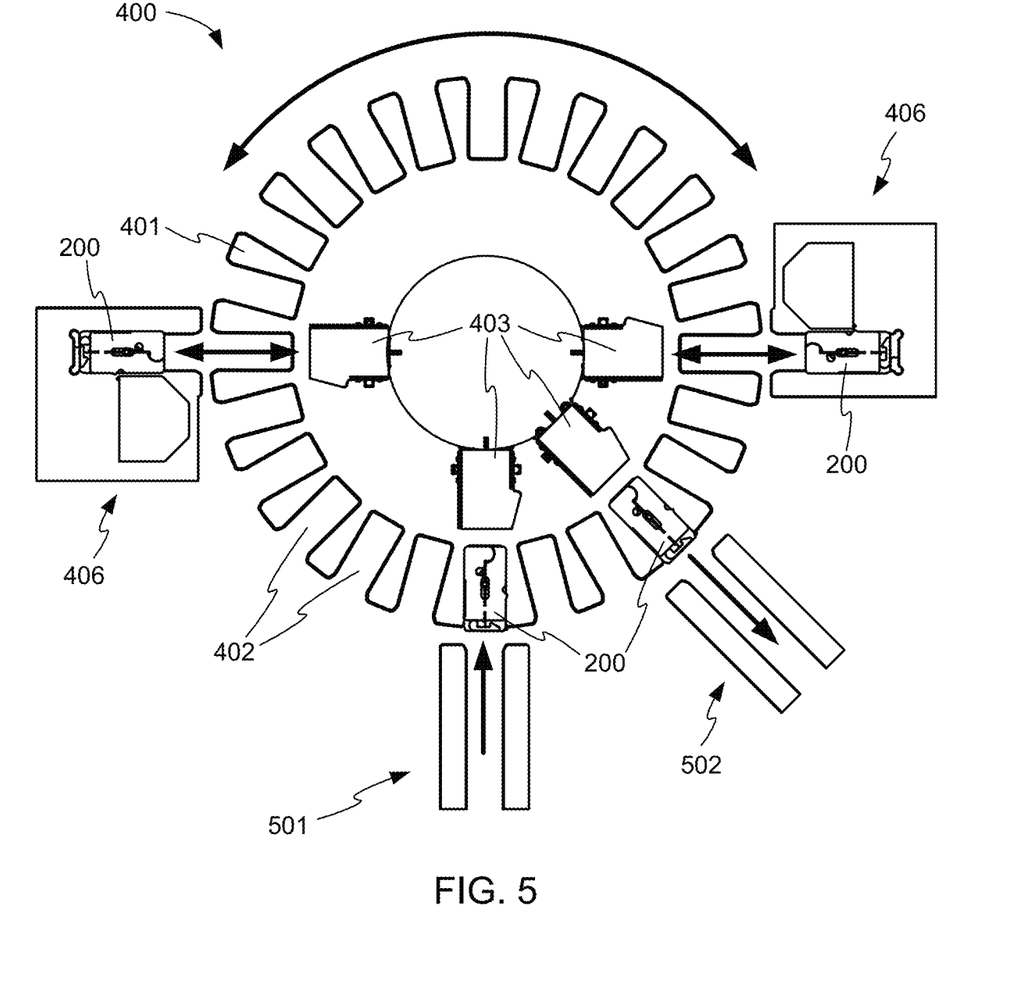
FIG. 5 shows a simplified schematic overhead view of some interior parts of the compounding device of FIG. 4.

FIG. 5 shows a simplified schematic overhead view of some interior parts of compounding device 400. In FIG. 5, two processing stations 406 are shown in simplified form. The processing stations may contain other elements needed to perform their specific functions, for example filling, capping, photographing, or measuring IV bags. A processing station used for placing medications in IV bags in the proper proportions may be called a "doser".

Also shown is a bag input station 501, through which bag assemblies 200 may be inserted into the system. Compounding device 400 may include a door or other opening for the insertion of bag assemblies, and may include measures for maintain sterility of the interior of compounding device 400 during the insertion, but these elements are not shown.

The system may deliver completed bag assemblies through a bag output station 502. Compounding device 400 may include a door or other opening for the delivery of bag assemblies, and may include measures for maintain sterility of the interior of compounding device 400 during the delivery, but these elements are not shown.

A number of bag transfer mechanisms 403 are mounted to carousel 401, and turn with it. Each of the bag transfer mechanisms 403 corresponds to one of receivers 402 of carousel 401.

In operation, with respect to a particular IV bag, the bag assembly 200 holding the bag is presented at bag input station 501. One of receivers 402, along with its corresponding bag transfer mechanism 403, is aligned with bag input station 501, and the bag assembly is pulled by the bag transfer mechanism 403 into the receiver 402. Carousel 401 rotates to present the bag assembly 200 to one of processing station 406, and the bag transfer mechanism 403 pushes the bag assembly 200 into the processing station 406. Once processing is completed, the bag transfer mechanism 403 pulls the bag assembly back into its receiver 402. Carousel 401 can then rotate to present the bag assembly 200 to one or more other processing stations 406 for further processing, if needed.

Once all necessary processing is completed, carousel 401 rotates to present the bag assembly 200 to output station 502, and the bag transfer mechanism 403 pushes the bag assembly 200 to output station 502 for delivery outside of compounding device 400.

Figure 6:
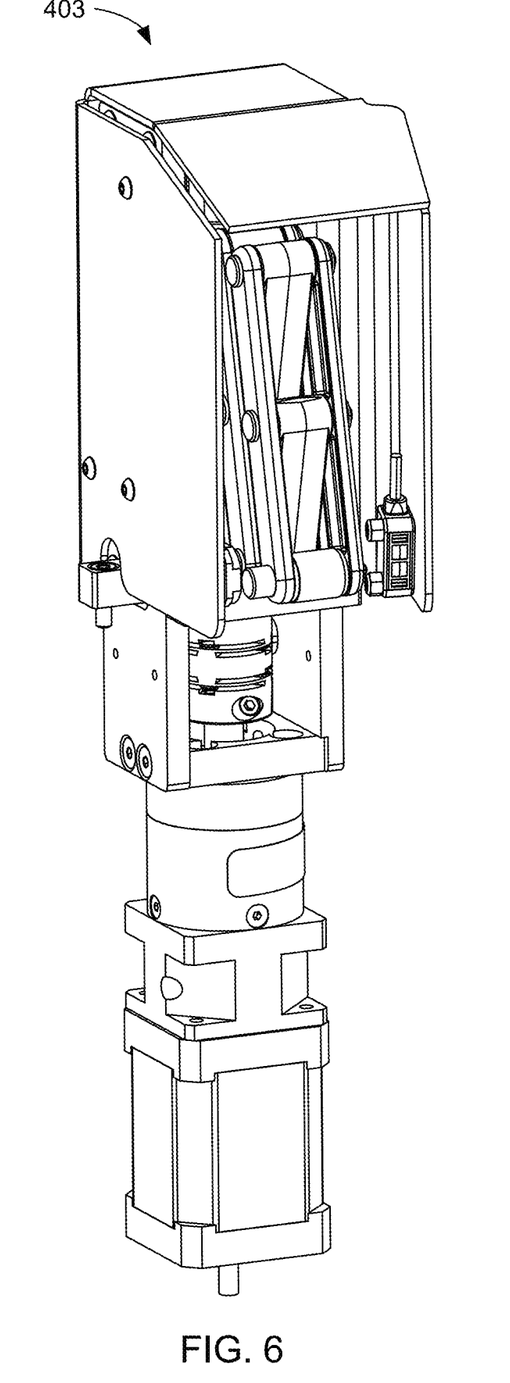
FIG. 6 shows a bag transfer mechanism in a retracted configuration, in accordance with embodiments of the invention.
Figure 7:
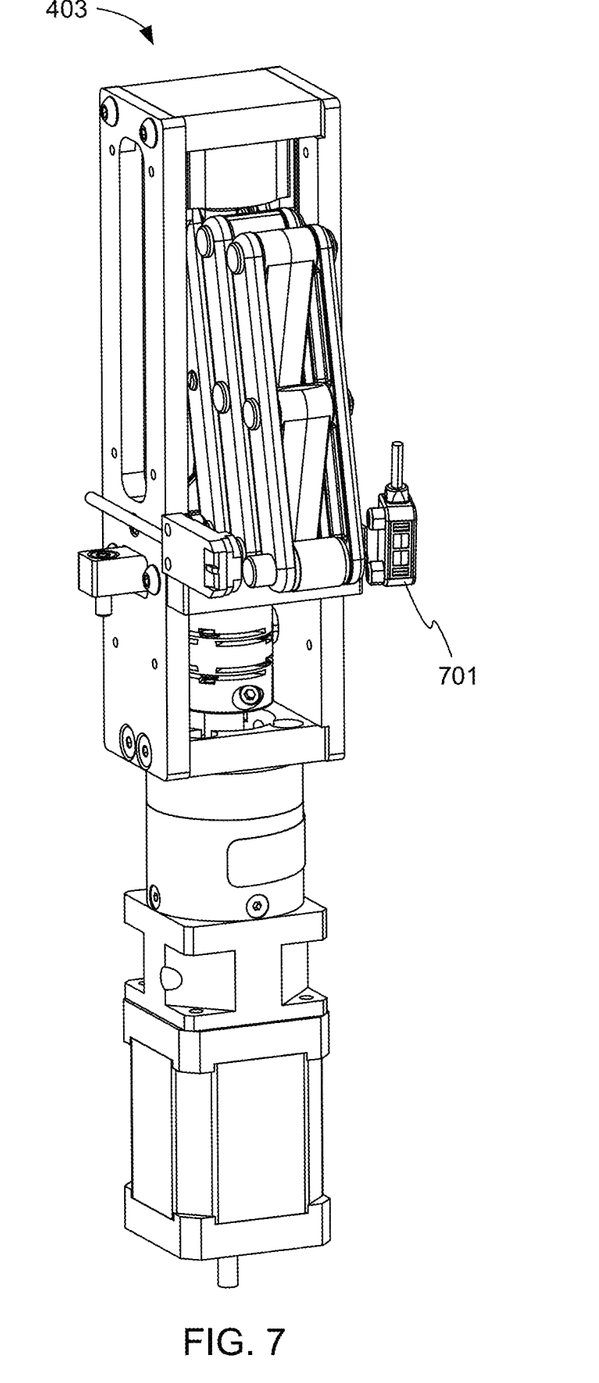
FIG. 7 shows the bag transfer mechanism of FIG. 6 in the retracted configuration, with an outer shroud removed.
Figure 8:
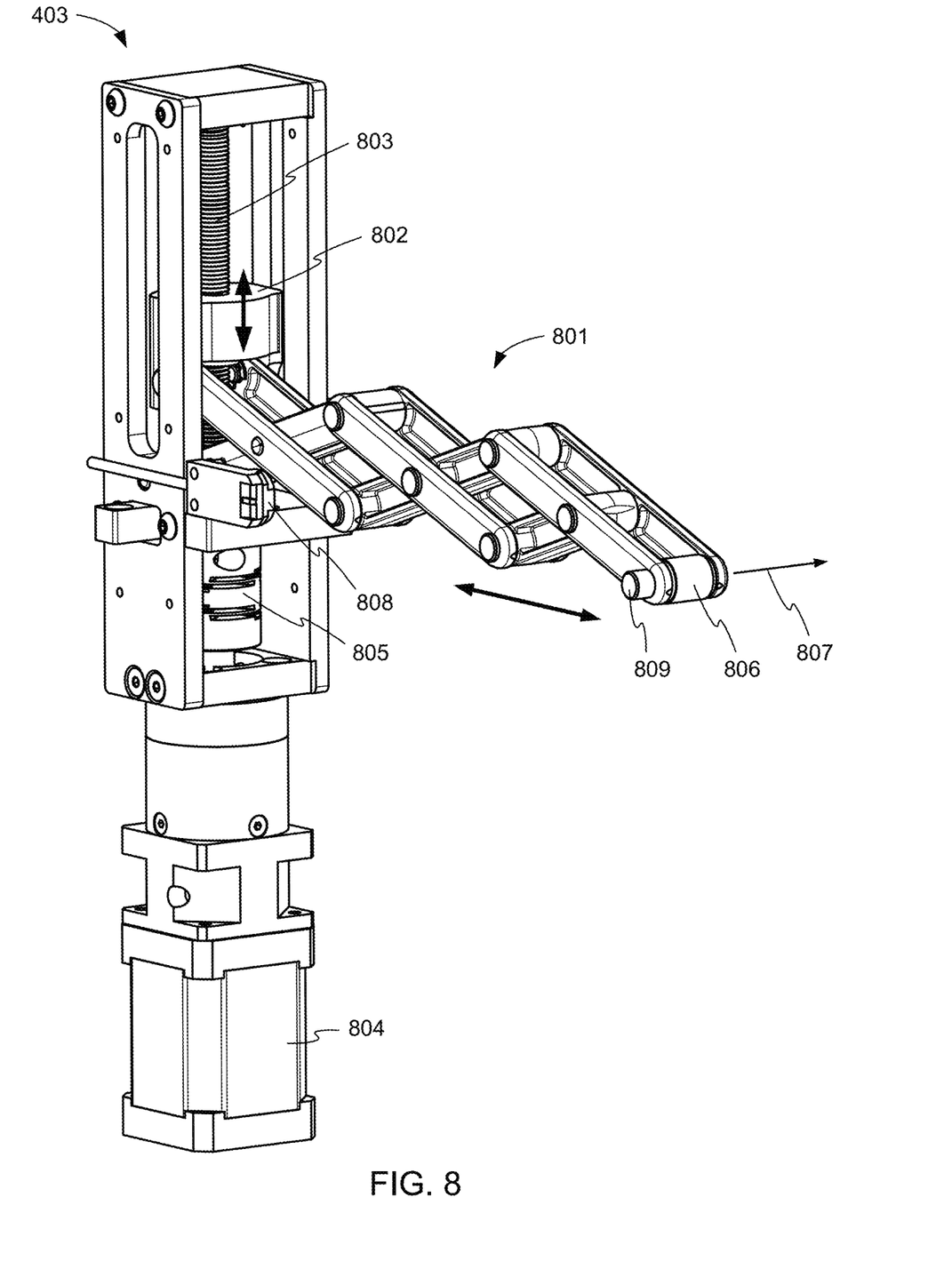
FIG. 8 shows the bag transfer mechanism of FIG. 6 in an extended configuration, in accordance with embodiments of the invention.

FIGS. 6-8 show one of bag transfer mechanisms 403 in more detail. FIG. 6 shows the complete bag transfer mechanism 403 in a retracted configuration, and FIG. 7 shows the bag transfer mechanism 403 in the retracted configuration, but with its outer shroud removed. FIG. 8 shows the bag transfer mechanism in an extended configuration, also with its outer shroud removed.

Referring to FIG. 8, bag transfer mechanism 403 includes a pantograph mechanism 801 configured to extend and retract to move bag assemblies 200. In this embodiment, one leg of pantograph mechanism 801 is attached to a nut 802, which in turn is coupled to a leadscrew 803. Leadscrew 803 is coupled to a motor 804, which can rotate leadscrew 803 in either direction. Nut 802 is constrained from rotation about the axis of leadscrew 803, and so travels axially along leadscrew 803.

One leg of pantograph mechanism 801 is connected to nut 802, so that as nut 802 moves, pantograph mechanism 801 extends or contracts, depending on the direction of rotation of leadscrew 803. Motor 804 and leadscrew 803 may be coupled through a flexible coupling if desired, for example a helical coupling 805.

Motor 804 may be any suitable type of motor, for example a stepper motor, a DC servo motor, or another kind of motor. Conveniently, motor 804 may be a DC servo motor with an encoder coupled to it, for measuring rotation of the motor, and therefore position of nut 802. The position measurement may conveniently be calibrated by driving motor 804 in one direction until no more motion of the shaft of motor 804 is detected. At that point, it can be assumed that nut 802 is at one extreme of its travel, and its position can thereafter be determined by counting the pulses or other signals produced by the encoder as the motor moves.

A proximal end of pantograph mechanism 801 is coupled to nut 802, and a magnet 806 is attached to the distal end (away from leadscrew 803) of pantograph mechanism 801. Magnet 806 is preferably cylindrical and is journaled on an axle (not visible) so that magnet 806 can freely rotate about its axis 807, although other arrangements are possible.

Leadscrew 803 with nut 802 is an example of a linear actuator for actuating pantograph mechanism 801, but in other embodiments, other kinds of linear actuators may be used. For example, pantograph mechanism 801 may be actuated by a pneumatic or hydraulic slide actuator, a linear electric motor, or another kind of linear actuator. Pantograph mechanism 801 is coupled to the linear actuator such that the pantograph mechanism extends when the linear actuator travels in a first direction, and retracts when the linear actuator travels in a second direction.

Bag transfer mechanism 403 preferably includes a retraction sensor 808, for sensing when pantograph mechanism 801 is fully retracted. Retraction sensor 808 may conveniently be a Hall effect sensor that detects the presence of a magnetic field. A ferromagnetic lobe 809 may be provided near magnet 806, so that when pantograph mechanism 801 is retracted, the magnetic field of magnet 806 is readily detectable by retraction sensor 808, as shown in FIG. 7. Any other suitable kind of sensor may be used as well, for example a capacitive sensor, an inductive sensor, a reflective optical sensor, an opto-interrupter, or another kind of sensor.

Referring again to FIG. 7, bag transfer mechanism 403 also preferably includes a structure sensor 701 for detecting structure near bag transfer mechanism 403. Structure sensor 701 may be, for example, an optical sensor that emits light and senses whether any of the light is reflected from a nearby object. Any other suitable kind of sensor may be used as well. If an object is detected when none is expected, the system may forgo extending bag transfer mechanism 403 and take corrective action, for example recalibrating the rotational position of carousel 401, or generating an error message.

Figure 9:
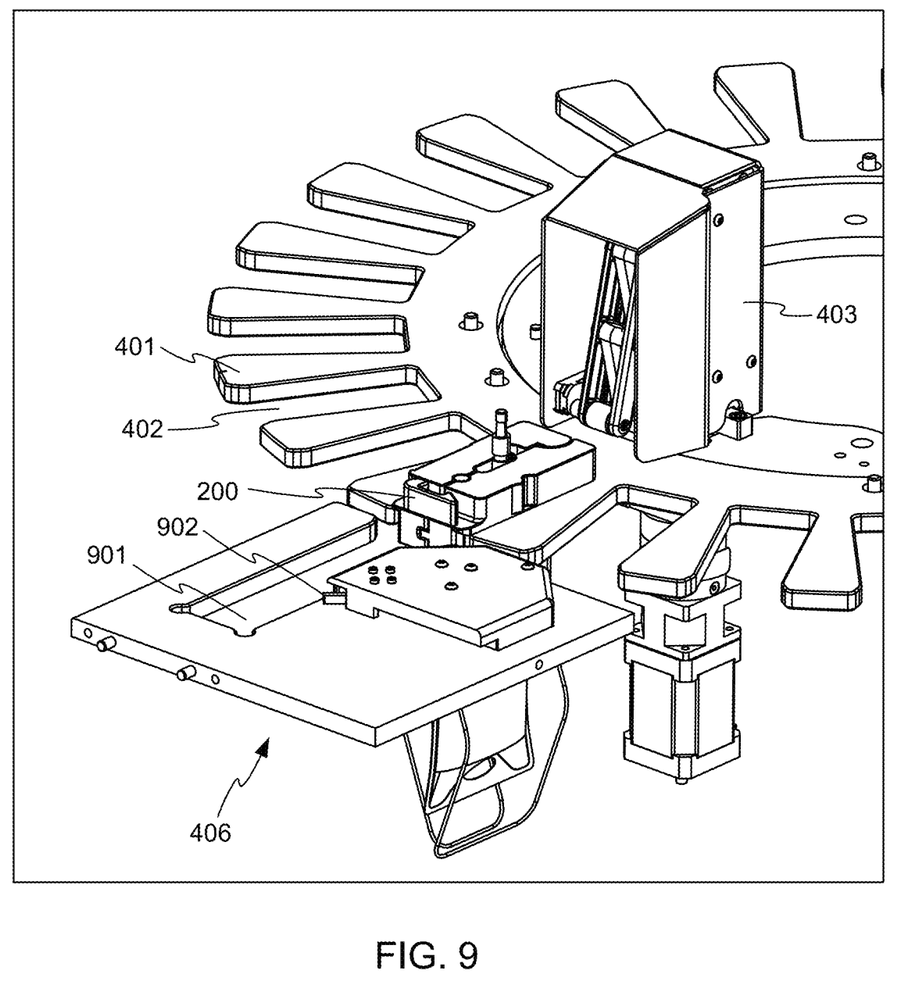
FIG. 9 illustrates a first state in the operation of the compounding device of FIG. 4, in accordance with embodiments of the invention.

FIGS. 9-12 illustrate steps in the operation of bag transfer mechanism 403. In this example, a bag assembly 200 is initially stored in one of receivers 402 of carousel 401, as shown in FIG. 9. Bag transfer mechanism 403 is in its retracted state. It is desired to transfer bag assembly 200 to processing station receiver 901 in processing station 406. A bag latch 902 is in a retracted state. The operation of bag latch 902 will be described in more detail below.

Figure 10:
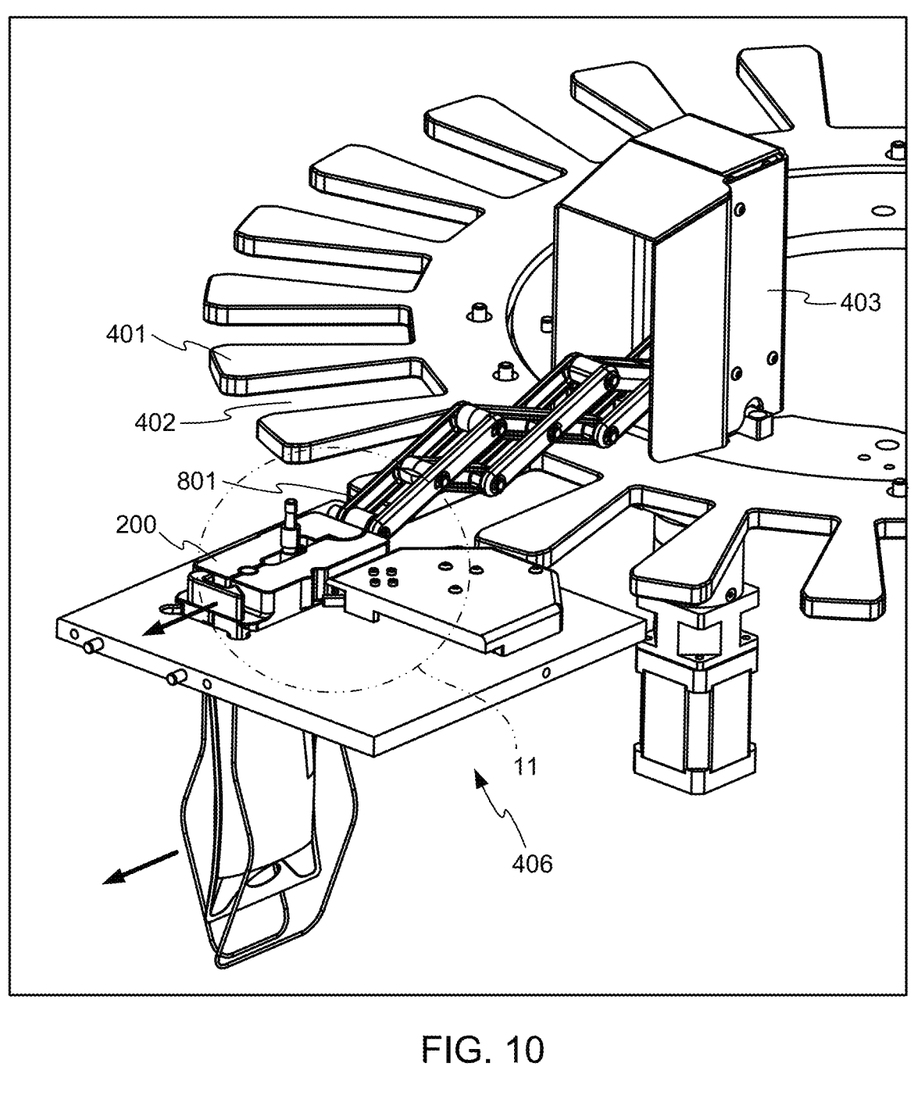
FIG. 10 illustrates another state in the operation of the compounding device of FIG. 4, in accordance with embodiments of the invention.

In FIG. 10, bag transfer mechanism 403 has extended pantograph mechanism 801, pushing the bag assembly 200 into the receiver of processing station 406.

Figure 11:
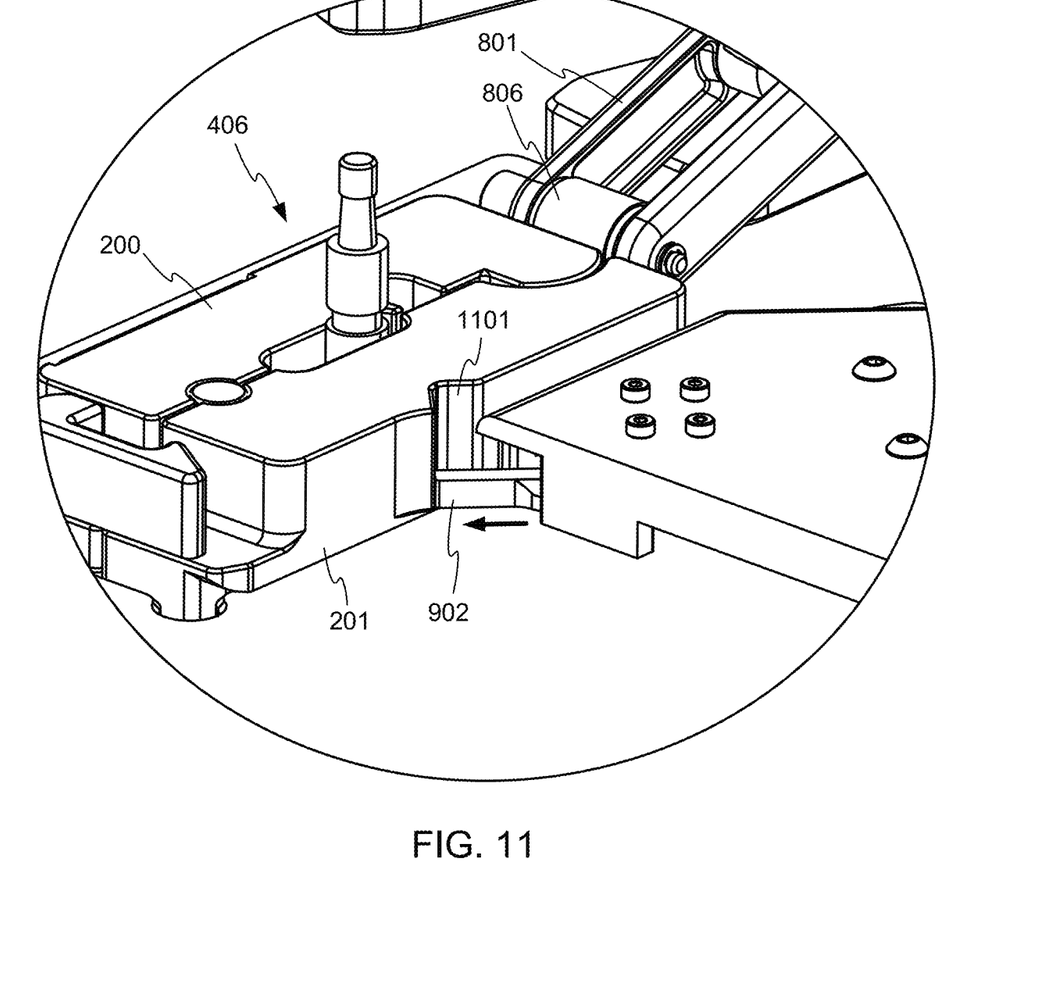
FIG. 11 shows another state in the operation of the compounding device of FIG. 4, in accordance with embodiments of the invention.

FIG. 11 shows a portion of FIG. 10 in more detail, including the operation of bag latch 902. Bag latch 902 has been extended in the direction shown, to engage with notch 1101 in bag clamp 201 of bag assembly 200. In the configuration of FIG. 11, magnet 806 of pantograph mechanism 801 is still coupled to bag clamp 201 by virtue of the attraction of magnet 806 to magnetic target 204 (not visible) of bag clamp 201. Without some means of retaining bag assembly 200 in processing station 406, pantograph mechanism 801 could not be retracted without drawing bag assembly 200 back out of processing station 406.

Bag latch 902 has been extended in the direction shown, to engage with notch 1101 in bag clamp 201 of bag assembly 200. Bag latch 902 thus selectively retains bag assembly 200 in processing station 406, even against the pull of magnet 806. Bag latch 902 may be a simple beam-like structure as shown, but may also be a lever, pin, friction brake, or any other suitable locking mechanism. Bag latch 902 may be actuated by a solenoid, lever, motor, memory metal actuator, or any other suitable actuator.

Figure 12:
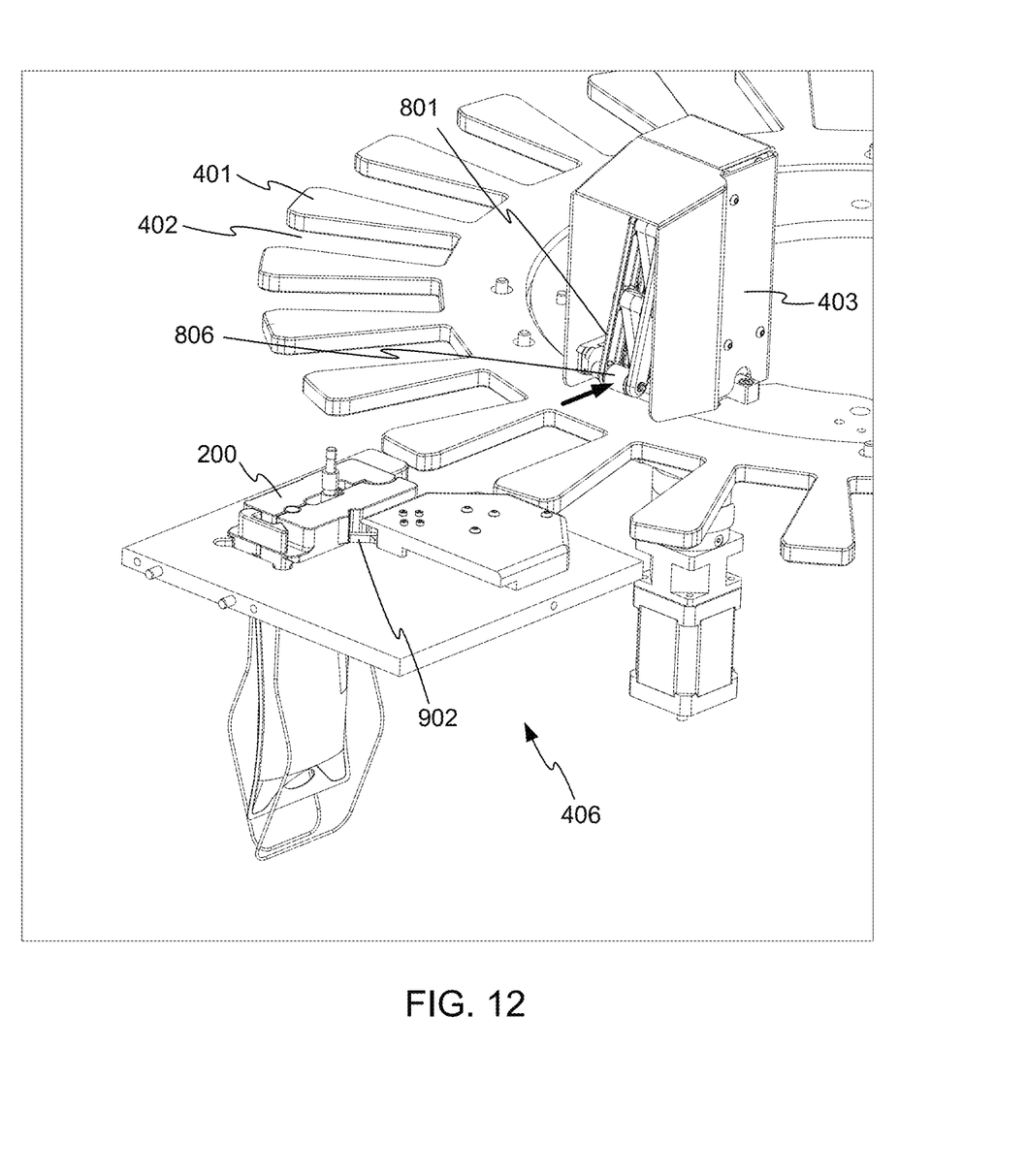
FIG. 12 shows another state in the operation of the compounding device of FIG. 4, in accordance with embodiments of the invention.

With bag latch 902 engaged, pantograph mechanism 801 can be retracted into bag transfer mechanism 403, as shown in FIG. 12. Bag latch 902 holds bag assembly 200 in processing station 406, while pantograph mechanism 801 retracts. Bag transfer mechanism 403 retracts with enough force to overcome the attraction of magnet 806 to magnetic target 204, separating magnet 806 from bag assembly 200.

To remove bag assembly 200 from processing station 406 and store it in one of receivers 402 of carousel 401, the receiver is aligned with processing station 406 and bag assembly 200. Pantograph mechanism 801 is extended so that magnet 806 engages magnetic target 204 (not visible) in bag assembly 200. Bag latch 902 is disengaged, and pantograph mechanism 801 is retracted, drawing bag assembly 200 into carousel 401.

Throughout the operation of bag transfer mechanism 403, whether pushing a bag assembly 200 into one of processing stations 406 or retrieving a bag assembly 200 from one of processing stations 406, no part of bag transfer mechanism 403 passes above the bag assembly 200. Bag transfer mechanism 403 thus performs its functions without interrupting or interfering with the flow of first air onto the bag assembly 200. Bag transfer mechanisms 403 are also compact, so that they do not encroach on space needed for other features of compounding device 400, for example a robot arm used to move syringes, vials, and the like.

Figure 13:
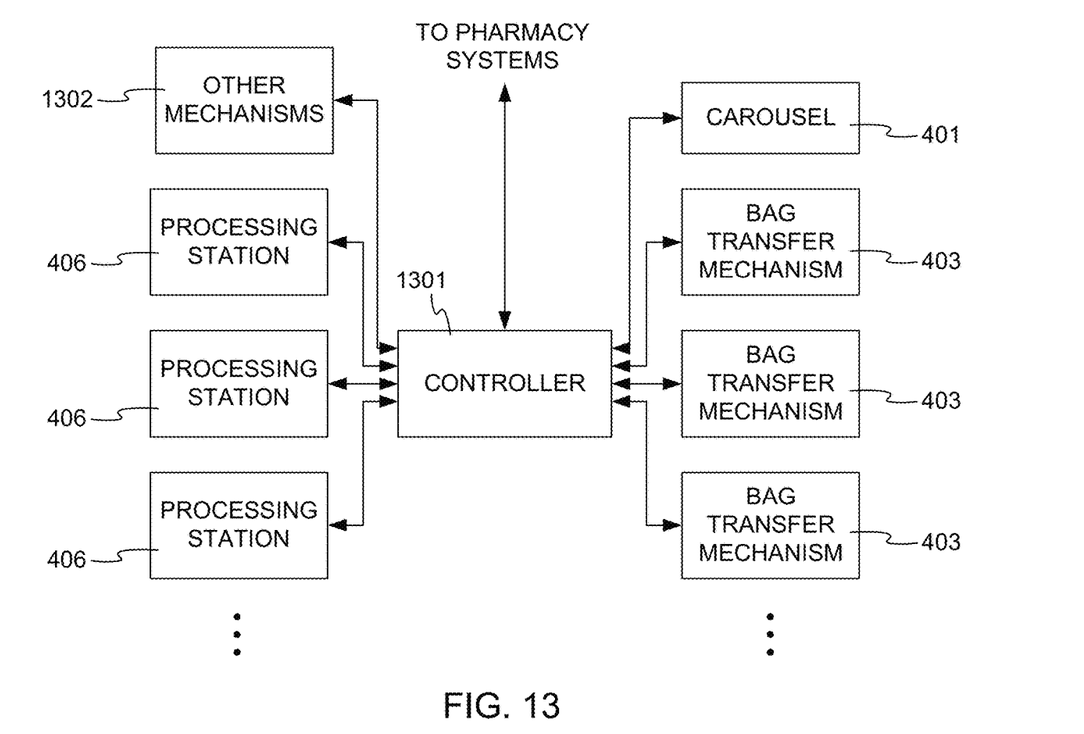
FIG. 13 shows a simplified schematic electrical architecture of the compounding device of FIG. 4, in accordance with embodiments of the invention.

FIG. 13 shows a simplified schematic electrical architecture of compounding device 400, in accordance with embodiments of the invention. A computerized controller 1301 communicates with a number of other components and systems. For example, controller communicates with a number of bag transfer mechanisms 403 as described above, and also controls the motion of carousel 401. Controller 1301 also communicates with the various processing stations 406. Conveniently, the processing stations 406 may have their own local computerized controllers, and the communications between them and controller 1301 may be in the form of commands and messages rather than low level control signals, but any allocation of control responsibility may be used. Controller 1301 also controls other mechanisms 1302 within compounding device 400, for example a robot arm or other devices.

Finally, controller 1301 may be in communication with a supervisory system of a pharmacy in which compounding device 400 is located. The supervisory system may instruct compounding device 400 as to specific compounding orders and the like.

It is to be understood that all workable combinations of the features disclosed herein are also considered to be disclosed.

The invention has now been described in detail for purposes of clarity and understanding. However, it will be appreciated that certain changes and modifications may be practiced within the scope of the appended claims.

What is claimed is:

1. A method of transferring a bag assembly with a bag transfer mechanism, the bag assembly having a bag for holding medication for intravenous delivery, the method comprising:

provide a pantograph mechanism having a proximal end and a distal end and a magnet coupled to the distal end, such that the magnet magnetically interacts with a magnetic target in the bag assembly; and retracting the pantograph mechanism such that the bag assembly is pulled from a first location to a second location by the pantograph mechanism and the magnetic attraction between the magnet of the pantograph mechanism and the magnetic target of the bag assembly.

2. The method of claim 1, further comprising:
repositioning the bag assembly; and
extending the pantograph mechanism such that the bag assembly is pushed from the second location to a third location by the pantograph mechanism.

3. The method of claim 2, further comprising:
engaging a bag latch configured to hold the bag assembly in the third location; and
retracting the pantograph mechanism such that the magnet of the pantograph mechanism disengages from the magnetic target of the bag assembly.

4. The method of claim 2, wherein repositioning the bag assembly comprises rotating a carousel on which the bag assembly is stored.

5. The method of claim 1, further comprising compounding a medication in the bag.

6. The method of claim 1, wherein the pantograph mechanism is coupled to a linear actuator such that the pantograph mechanism extends when the linear actuator is moved in a first direction and the pantograph mechanism retracts when the linear actuator is moved in a second direction.

7. The method of claim 6, wherein the linear actuator comprises:
a motor having a shaft;
a leadscrew coupled to the shaft of the motor such that the leadscrew is configured to be rotated by the motor; and
a nut coupled to the leadscrew, the nut being constrained from rotating about a longitudinal axis of the leadscrew, such that the nut is configured to travel axially along the leadscrew when the leadscrew rotates;
wherein the proximal end of the pantograph mechanism is coupled to the nut such that the pantograph mechanism is configured to extend when the nut travels in the first direction along the leadscrew, and to retract when the nut travels in the second direction along the leadscrew.

8. The method of claim 6, wherein the linear actuator comprises a pneumatic or hydraulic slide, or a linear electric motor.

9. The method of claim 1, wherein the magnet is rotatably coupled to the distal end of the pantograph mechanism.

10. The method of claim 1, wherein the pantograph mechanism is retracted until the pantograph mechanism is in a retracted position.

11. The method of claim 10, wherein the bag transfer mechanism further comprises a retraction sensor configured to detect when the pantograph mechanism is in the retracted position.

12. The method of claim 11, further comprising detecting with the retraction sensor that the pantograph mechanism is in the retracted position.

13. The method of claim 11, wherein the retraction sensor detects proximity of the magnet.

14. The method of claim 1, wherein the bag transfer mechanism further comprises a structure sensor configured to detect the presence or absence of another structure adjacent the mechanism.

15. The method of claim 1, wherein the bag assembly comprises:
a bag configured for holding liquid medication for intravenous delivery, the bag comprising an infusion port for delivery of medication from the bag, and the bag comprising an injection port for receiving medication into the bag; and
a bag clamp having first portion and a second portion together forming a clamshell structure, and clamped to the bag such that the clamp constrains the relationship of the infusion port and the injection port;
wherein the magnetic target is located at one end of the bag clamp.

16. The method of claim 15, wherein the bag clamp further comprises a first wire frame extending from the first portion and a second wire frame extending from the second portion, the first and second wire frames together extending around the bag.

17. The method of claim 15, wherein the magnetic target is embedded within the clamp.

18. The method of claim 15, wherein the bag further comprises a first identifying label, and wherein the clamp comprises a second identifying label, and wherein the first and second identifying labels correspond to each other.

\* \* \* \* \*

UNITED STATES PATENT AND TRADEMARK OFFICE
CERTIFICATE OF CORRECTION

| | | |
|---|---|---|
| PATENT NO. | : 12,427,090 B2 | Page 1 of 1 |
| APPLICATION NO. | : 18/757953 | |
| DATED | : September 30, 2025 | |
| INVENTOR(S) | : Robert Eckert et al. | |

It is certified that error appears in the above-identified patent and that said Letters Patent is hereby corrected as shown below:

In the Specification

Column 3, Line 62, add "." after "invention"

Column 5, Line 24, remove ")" after "like."

Signed and Sealed this
Sixth Day of January, 2026

John A. Squires
*Director of the United States Patent and Trademark Office*